United States Patent
Harris et al.

(10) Patent No.: US 7,469,149 B2
(45) Date of Patent: Dec. 23, 2008

(54) METHOD AND APPARATUS FOR SERIALLY ESTABLISHING A GROUP CALL SESSION

(75) Inventors: John M. Harris, Chicago, IL (US); Sean S. Kelley, Barrington, IL (US); Hua Xu, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 750 days.

(21) Appl. No.: 11/144,903

(22) Filed: Jun. 3, 2005

(65) Prior Publication Data

US 2006/0276214 A1 Dec. 7, 2006

(51) Int. Cl.
*H04Q 7/20* (2006.01)
(52) U.S. Cl. .................. 455/519; 455/518; 455/500; 455/416; 455/445; 455/422.1; 709/202; 709/203; 709/204; 709/216; 709/218
(58) Field of Classification Search .......... 455/519, 455/518, 500, 501, 445, 422.1, 403, 435, 455/414.1, 414.2, 414.3, 550.1, 456.1–457, 455/416; 709/202, 203, 204, 216, 218, 219, 709/228, 229
See application file for complete search history.

(56) References Cited

U.S. PATENT DOCUMENTS

| | | | |
|---|---|---|---|
| 5,953,673 A | 9/1999 | Neubauer et al. | |
| 5,987,318 A | 11/1999 | Alperovich et al. | |
| 6,385,461 B1 | 5/2002 | Raith | |
| 6,542,750 B2* | 4/2003 | Hendrey et al. | 455/456.1 |
| 2003/0153339 A1 | 8/2003 | Crockett et al. | |
| 2004/0205134 A1* | 10/2004 | Digate et al. | 709/206 |
| 2004/0249949 A1* | 12/2004 | Gourraud et al. | 709/227 |

FOREIGN PATENT DOCUMENTS

| | | |
|---|---|---|
| EP | 1209849 A2 | 5/2002 |
| EP | 1473871 A2 | 11/2004 |
| KR | 10-1998-0025442 | 11/1999 |
| WO | 9805177 | 2/1998 |
| WO | 0030375 | 5/2000 |
| WO | 03039181 A1 | 5/2003 |

* cited by examiner

*Primary Examiner*—Keith T Ferguson (57) ABSTRACT

Various embodiments are described for establishing a group call session serially. After receiving a serial group call request from a remote unit (101), fixed network equipment (FNE) (201) selects a first subset of members (260) from the targeted group (250) of units and signals those members to join the group call session. Various techniques for selecting the first subset may be employed depending on what system benefits are desired. A second subset of members (270) from the targeted group of units is also selected and signaled to join the session. This second subset may be used to invite additional units in order to achieve a maximum number of group participants. Alternatively, the second subset may be used to invite a different unit (or units) to participate. This can be triggered by a user request to invite another subset to the group session, as could occur when the user is not able to resolve the particular matter at-hand with the group members of the first subset.

18 Claims, 5 Drawing Sheets

METHOD AND APPARATUS FOR SERIALLY ESTABLISHING A GROUP CALL SESSION

FIELD OF THE INVENTION

The present invention relates generally to communication systems and, in particular, to serially establishing a group call session.

BACKGROUND OF THE INVENTION

Existing push to talk (PTT) calling systems allow a user to make a call to a group of other users. This can be very desirable, for example, when the input of a particular group is needed to discuss a matter. However, situations may arise when a user only needs to call a subset (one, e.g.) of the group members and calling the entire group is wasteful of system resources or unnecessarily disruptive of the group. For example, a user may need to talk to help desk person about a problem or to a manager to obtain authorization. The user does not need to talk to the whole help desk group or everyone in the manager group. Any one help desk person or manager would probably suffice.

Present calling systems allow the user to call an individual rather than the group. However, this can be a relatively burdensome task for the user to perform manually. The user may need to obtain an individual identifier for a group member, call that individual, and then possibly retry or call another if unsuccessful. Calling the entire group may be easier for the user but, as discussed above, it may be more wasteful and/or disruptive.

Accordingly, it would be desirable to have a method and apparatus for establishing a group call session involving a subset of a group's members, which provides some improvement over today's capabilities.

Specific embodiments of the present invention are disclosed below with reference to FIGS. 1-5. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments are described for establishing a group call session serially. After receiving a serial group call request from a remote unit, fixed network equipment (FNE) selects a first subset of members from the targeted group of units and signals those members to join the group call session. Various techniques for selecting the first subset may be employed depending on what system benefits are desired. A second subset of members from the targeted group of units is also selected and signaled to join the session. This second subset may be used to invite additional units in order to achieve a maximum number of group participants. Alternatively, the second subset may be used to invite a different unit (or units) to participate. This can be triggered by a user request to invite another subset to the group session, as could occur when the user is not able to resolve the particular matter at-hand with the group members of the first subset.

Figure 1:
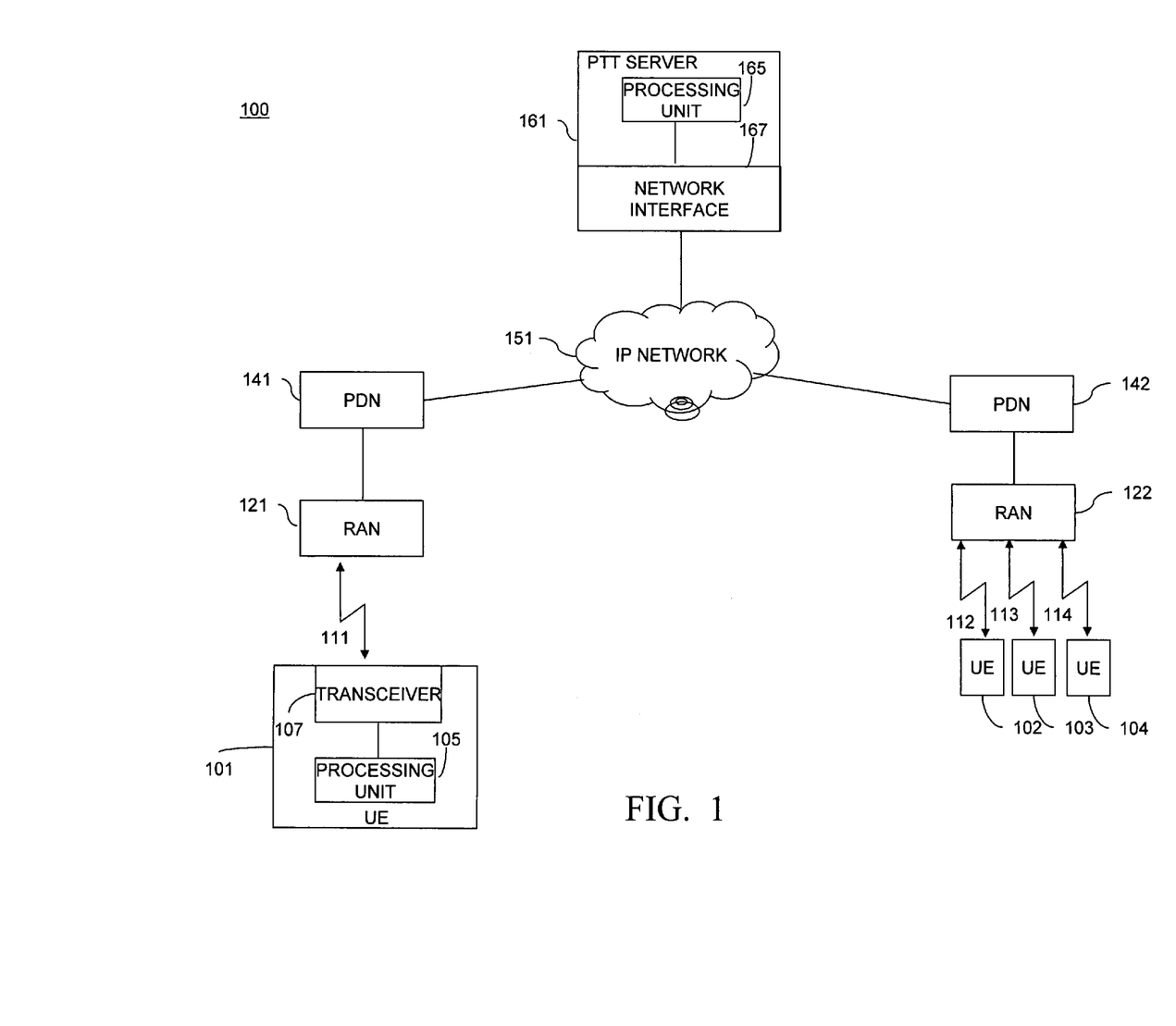
FIG. 1 is a block diagram depiction of a wireless communication system in accordance with multiple embodiments of the present invention.

The disclosed embodiments can be more fully understood with reference to FIGS. 1-5. FIG. 1 is a block diagram depiction of a wireless communication system 100 in accordance with multiple embodiments of the present invention. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for wireless telecommunications systems. (These groups may be contacted via http://www.openmobilealliance.com, http://www.3gpp.org/, http://www.3gpp2.com/ and http://www.ieee802.org/, respectively.) Communication system 100 represents a system having an architecture in accordance with one or more of the 3GPP2 technologies (e.g., CDMA 2000 and/or HRPD (also known as 1xEV-DO or IS-856)), suitably modified to implement the present invention. For example, RANs 121 and 122 may each employ the same wireless technology or different wireless technologies.

Alternative embodiments of the present invention may be implemented in communication systems that employ other or additional technologies such as, but not limited to, those described in the 3GPP specifications (e.g., GSM, GPRS, EDGE, W-CDMA, UTRAN, FOMA, UMTS, HSDPA, and HSUPA), those described in the IEEE's 802.11, 802.16, and 802.20 specifications, those described in the OMA standards specifications, those described in the IS-136 (TDMA Third Generation Wireless Standards) specification, those described in the IS-95 (CDMA) specification, 1xEV-DV technologies, and integrated dispatch enhanced network technologies. Furthermore, alternative embodiments of the present invention may also be implemented in communication systems in which RANs 121 and 122 represent access networks that physically and/or functionally overlap considerably. For example, RANs 121 and 122 may differ only in the component access points (APs), base transceiver stations (BTSs), or base station sectors that communicate with a particular remote unit.

More specifically, communication system 100 comprises user equipment (UE) 101-104, radio access networks (RANs) 121 and 122, packet data networks 141 and 142, IP (internet protocol) network 151, and PTT server 161. Those skilled in the art will recognize that FIG. 1 does not depict all of the network equipment necessary for system 100 to operate but only those system components and logical entities particularly relevant to the description of embodiments herein. For example, packet data networks are known to comprise devices such as packet data serving nodes (PDSNs). Also, RANs are known to comprise devices such as base transceiver stations (BTSs), base site controllers (BSCs), and packet control functions (PCFs). Alternatively, RANs are known to comprise one or more devices such as WLAN (wireless local area network) stations (which include access points (APs), AP controllers/switches, and/or WLAN switches), packet control units (PCUs), and/or radio network controllers (RNCs). However, none of these devices are specifically shown in FIG. 1.

PTT server 161 is depicted in FIG. 1 as comprising processing unit 165 and network interface 167. In general, components such as processing units and network interfaces are well-known. For example, server processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using messaging flow diagrams, and/or expressed using logic flow diagrams.

Thus, given an algorithm, a logic flow, a messaging/signaling flow, and/or a protocol specification, those skilled in the art are aware of the many design and development techniques available to implement a server processing unit that performs the given logic. Therefore, PTT server 161 represents a known PTT server that has been adapted, in accordance with the description herein, to implement multiple embodiments of the present invention. Furthermore, those skilled in the art will recognize that aspects of the present invention may be implemented in and across various physical components and none are necessarily limited to single platform implementations. For example, the PTT server aspect of the present invention may be implemented in a RAN, in a PDN, on a dedicated network server platform, or distributed such components.

RANs 121 and 122 use air interfaces comprising channel groups 111-114 for communication with UEs 101-104. 3GPP2 channel groups 111-114 each comprise traffic channels, which are dynamically assigned and de-assigned to support user services, and a variety of well-known non-traffic channel types, such as broadcast channels, paging channels, access channels and common control channels, all in accordance with the particular 3GPP2 signaling technology used.

Remote units or UEs may be thought of as mobile stations (MSs); however, UEs are not necessarily mobile nor able to move. Thus, UE platforms are known to refer to a wide variety of consumer electronic platforms such as, but not limited to, mobile stations (MSs), access terminals (ATs), terminal equipment, gaming devices, personal computers, personal digital assistants (PDAs), cable set-top boxes and satellite set-top boxes. In particular, UE 101 comprises processing unit 105, transceiver 107, a keypad (not shown), a speaker (not shown), a microphone (not shown), and a display (not shown). Processing units, transceivers, keypads, speakers, microphones, and displays as used in UEs are all well-known in the art.

For example, UE processing units are known to comprise basic components such as, but neither limited to nor necessarily requiring, microprocessors, digital signal processors (DSPs), microcontrollers, memory devices, application-specific integrated circuits (ASICs), and/or logic circuitry. Such MS components are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm, a logic flow, a messaging/signaling flow, a call flow, and/or a protocol specification, those skilled in the art are aware of the many design and development techniques available to implement user equipment that performs the given logic. Therefore, UE 101 represents a known UE that has been adapted, in accordance with the description herein, to implement embodiments of the present invention.

Figure 2:
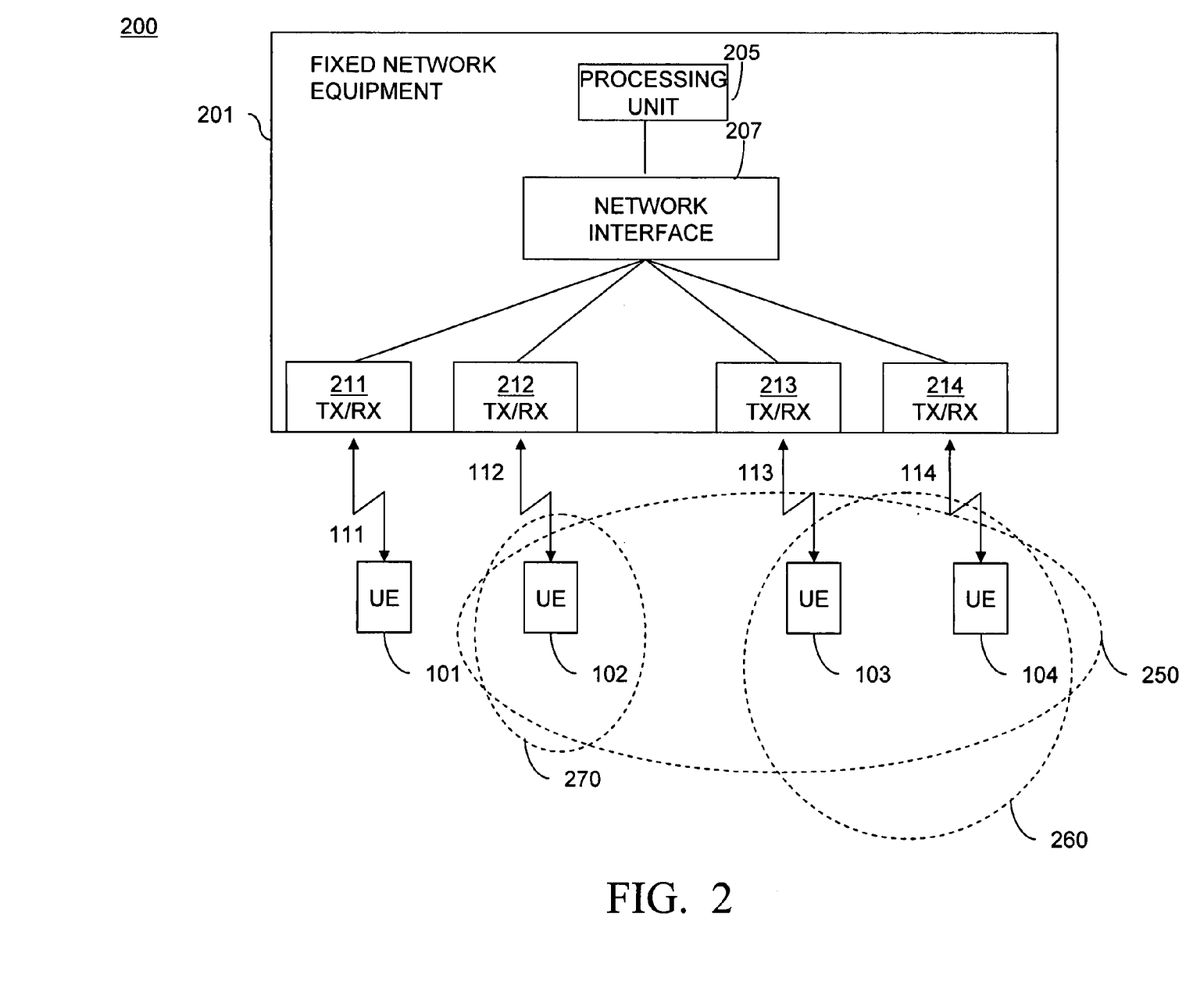
FIG. 2 is a more generalized block diagram depiction of a wireless communication system in accordance with multiple embodiments of the present invention.

FIG. 2 is a block diagram depiction of a wireless communication system 200 in accordance with multiple embodiments of the present invention. Communication system 200 is depicted in a more generalized manner than communication 100. In particular, the communications infrastructure is represented by fixed network equipment (FNE) 201. Those skilled in the art will recognize that FIG. 2 does not depict all of the physical FNE components necessary for system 200 to operate but only those system components and logical entities particularly relevant to the description of embodiments herein. For example, FIG. 2 depicts FNE 201 as comprising transceivers 211-214, network interface 207, and processing unit 205. The description above regarding network interface 167 and processing unit 165 applies respectively to network interface 207 and processing unit 205 except that neither network interface 207 nor processing unit 205 are depicted as components of a PTT server.

Operation of various embodiments in accordance with the present invention occur substantially as follows. UE processing unit 105 sends, via transceiver 107, a call request that indicates a group of units to target serially for a group call session. Depending on the embodiment, UE 101 may send a group identifier to identify the group of units to target. In this case, FNE processing unit 205 would have stored a list of group member identifiers associated with the group identifier. Alternatively, UE 101 could send a call request that identifies units individually (e.g., conveying the list of group member identifiers in the request), thereby identifying the group of units to target for the group call session. Also, depending on the embodiment, UE 101 may also send a call request that further conveys a maximum number of participants allowed for the group call session. Alternatively, UE 101 may simply indicate that FNE processing unit 205 should use its stored value (as associated with the group identifier, e.g.) for the maximum number of participants to allow in the group call session.

Establishing a group call serially differs from present day group call establishment in that subsets of the target group are signaled to join the group call session in stages over time. Also, events occurring during one stage can determine whether there is a subsequent stage or how a subset of the target group will be selected for a subsequent stage. The subsets can contain as few as one group member, and the size of the subsets can vary from one stage to the next. For example, the size of a subset may be determined by the maximum number of participants indicated (i.e., conveyed or otherwise indicated) by the caller. If the maximum number of group participants indicated is one, then the subset at each stage can be effectively limited to a single group member. In some embodiments, the FNE will use the maximum number of group participants indicated as the size of the first subset. If not all of the group members in the first subset join the group call session or remain joined, a second subset is selected and signaled to join in order to fill the vacancies left by those in the first subset that are not joined.

FNE processing unit 205 receives, from UE 101 (the caller) via network interface 207, the call request indicating the group of units (group 250) to target serially for the group call session. In response, FNE processing unit 205 selects a first subset (subset 260) of the target group of units and signals, via network interface 207, the selected units (UE 103 and 104) to join the group call session. Depending on the embodiment, the signaling to join the group call session may comprise sending Session Initiation Protocol (SIP) INVITE messaging and/or channel assignment messaging. Thus, the FNE can thereby establish a call involving members of the first subset (UE 103 and 104) of the target group (group 250) during a first portion of the group call session, and UE processing unit 105, via transceiver 107, can participate in the call with members of the first subset.

Depending on the embodiment, there are many ways for FNE processing unit 205 to select the first subset. One way is to select the first subset of the target group of units in accordance with or based on some indication of a desired subset that is received from the caller. Another way is to select the first subset based on a presence state of units in the target group. For example, units having a presence state that indicates that the unit is available (at least to some degree) may be selected. Units who are available and whose presence state was recently updated (e.g., last updated within a threshold period of time such as 1 minute) may be prioritized for selection. In some embodiments, the subset selection process may also involve requesting a presence update for and/or paging one or more of the target group units. This has the advantage of obtaining more current information and therefore the potential to enable more optimal subset selection. However, in alternative embodiments, units may be selected before being paged and/or without being pinged for a presence update.

In addition to or instead of using presence information for subset selection and depending on the embodiment, FNE processing unit 205 may use one or more of the following remote unit characteristics for subset selection. The FNE may page a unit and eliminate it from subset selection if a page response is not received. The wireless operating conditions of a unit may also be considered. For example, a unit experiencing poor RF conditions may be eliminated, although it may be advantageous to select a unit experiencing wireless operating conditions similar to those the caller is experiencing, even when these conditions are not particularly good. More evenly matching their communication capabilities can be desirable for partner selection in wireless gaming or when units are expected to be exchanging data, e.g.

The loading level of a unit's serving cell (where cell is understood to refer to a sector in sectorized cell sites) may also be considered during subset selection. For example, a unit in a heavily loaded cell may be selected only when no other units are served by less loaded cells. In general, system capacity can be improved by selecting units that are served by less loaded cells. The mobility level, trajectory, and/or location of a unit may also be considered. For example, a relatively stationary unit may be more desirable for selection since its other characteristics (wireless operating conditions, loading level of its serving cell, etc.) are less likely to change. However, in some embodiments, it may be desirable to consider a more mobile unit's trajectory in order, for example, to select a unit that has a similar trajectory to that of the caller or a trajectory towards less loaded cells. In some embodiments, location may also be an important selection factor. For example, units with a particular location or perhaps units nearest the caller may be prioritized for selection.

Unit battery life may also be considered during subset selection. For example, units with greater remaining battery life or units that are plugged into a power source may be more desirable for selection. In some embodiments, the access technology that a particular unit would use and/or the relative cost of that access technology may be considered. For example, some access technologies may not be able to provide a desired data rate or may be substantially more expensive than access technologies used by other units. Other factors that may be considered include whether a unit is operating in an automatic answer mode (e.g., a PTT automatic answer mode), what service class is associated with a unit, and/or what priority status is associated with a unit (e.g., has a unit been designated as preferred for selection relative to other units in the target group).

In addition to or instead of using some combination of the factors discussed above for subset selection and depending on the embodiment, FNE processing unit 205 may perform subset selection, at least in part, by signaling them in one or more of the following manners. The FNE may only transmit paging messages associated with the target group in cells that have a loading level below a load threshold (e.g., 90% loaded). In addition or alternatively, the FNE may transmit paging messages associated with the target group at a lower power level and/or with less redundancy than other pages. By signaling units in this manner, the impact to loaded cells can be reduced since these cells are either not used or units on the edge of these loaded cells will not be able to decode the page and respond.

Thus, regardless how the first subset of units is selected, the FNE signals them to join the group call session and establishes a call (assuming that one or more members of the first subset actually join). UE processing unit 105, via transceiver 107, can then participate in the call with members of the first subset. Depending on the embodiment, FNE processing unit 205 may receive via network interface 207 an indication that a call involving members of a subset of the target group other than the first subset is needed. This indication may take the form of an expiration of a response timer associated with a member of the first subset (e.g., no page response from that member or no PTT acceptance with 20 seconds) or non-acceptance signaling (e.g., a busy indication) from a member of the first subset. However, if one or more members of the first subset do join, FNE processing unit 205 may wait to receive another indication such as a request, from the caller (i.e., from UE processing unit 105 via transceiver 107) or from a member of the first subset, for a call involving another subset of target group members. Such a request may result when the caller or another participant determines that different group members are needed to answer a question, grant authorization, accept an assignment, discuss the matter at-hand, etc. In some embodiments, an indication of desired group members to invite may be included with the request, or may be or may have been sent independently.

Using a different selection technique (such as a different combination of factors described above) or the same selection technique as was used to select the first subset, FNE processing unit 205 selects a second subset (subset 270) of the target group of units and signals, via network interface 207, the selected unit (UE 102) to join the group call session. Thus, during a second portion of the group call session, the FNE establishes a call involving members of the second subset (i.e., UE 102) of the target group (group 250). The members of the first subset may either continue participating in the group call session or they may leave according to each member's preference.

Either way UE processing unit 105 via transceiver 107 participates in the call with members of the second subset. Participation in the group call session by the caller and callees may take various forms. They may participate in a voice call, they may exchange information, they may interact in a gaming environment, etc. For example, the UE processing unit 105 via transceiver 107 may send the FNE a request to record audio for delivery to the participants of one or more of the call segments in the group call session. Thus, the caller may record his or her question or request for the target group members (perhaps at the time of making the serial group call request). The resulting audio clip could then be played to the call participants when each new subset of units joins the call session or at the request of the caller. In this way, the same question could be asked (i.e., replayed) to individuals of the target group sequentially (i.e., as the FNE progresses through different subsets of the target group) until someone has a satisfactory answer.

The description above focuses primarily on embodiments in which new subsets are selected and the member units signaled in response to some indication that a different subset of members is needed. In alternative embodiments new subsets are selected and the member units signaled in order to achieve and/or maintain a maximum number of group participants for the group call session. For example, FNE processing unit 205 may select a first subset (subset 260) of the target group of units to achieve the maximum number of group participants (in this example, two). However, FNE processing unit 205 may determine that a number of units from the first subset is not joining (or is leaving) the group call session, i.e., a non-joining number of units (in this example, one). In response, FNE processing unit 205 selects a non-joining number of units for the second subset (subset 270) and thereby achieves and/or maintains the maximum number of group participants for the call session.

Figure 3:
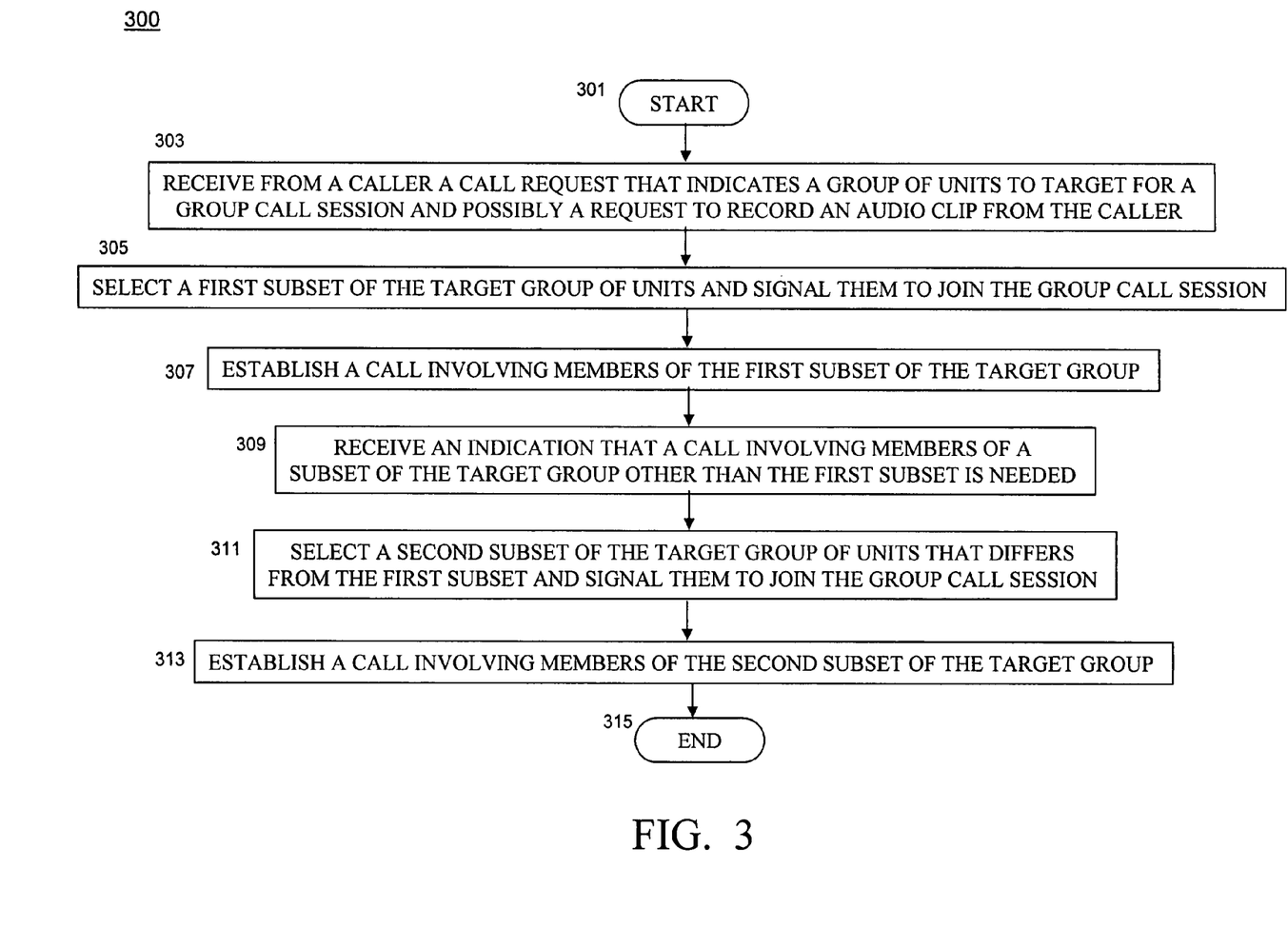
FIG. 3 is a logic flow diagram of functionality performed by fixed network equipment (FNE) in accordance with certain embodiments of the present invention.

FIG. 3 is a logic flow diagram of functionality performed by fixed network equipment (FNE) in accordance with certain embodiments of the present invention. Logic flow 300 begins (301) when the FNE receives (303) from a caller a call request that indicates a group of units to target for a group call session. The FNE then selects (305) a first subset of the target group of units and signals them to join the group call session. Assuming some members of the first subset join, the FNE establishes (307) a call involving the joining members of the first subset. Upon receiving (309) an indication that a call involving a different subset of group members is needed or desired, the FNE selects (311) a second subset of the target group of units and signals them to join the group call session. The indication that a call involving a different subset of group members is needed or desired may be received from the caller or other group members or it may be received in the form of a timer expiration or an indication that the group call session does not have a maximum number of participants. Assuming some members of the second subset join, the FNE thus establishes (313) a call involving the joining members of the second subset, and logic flow 300 ends (315). However, the steps represented by blocks 309, 311 and 313 may be reiterated for subsequent call stages that require new subsets of group members to be joined.

Figure 4:
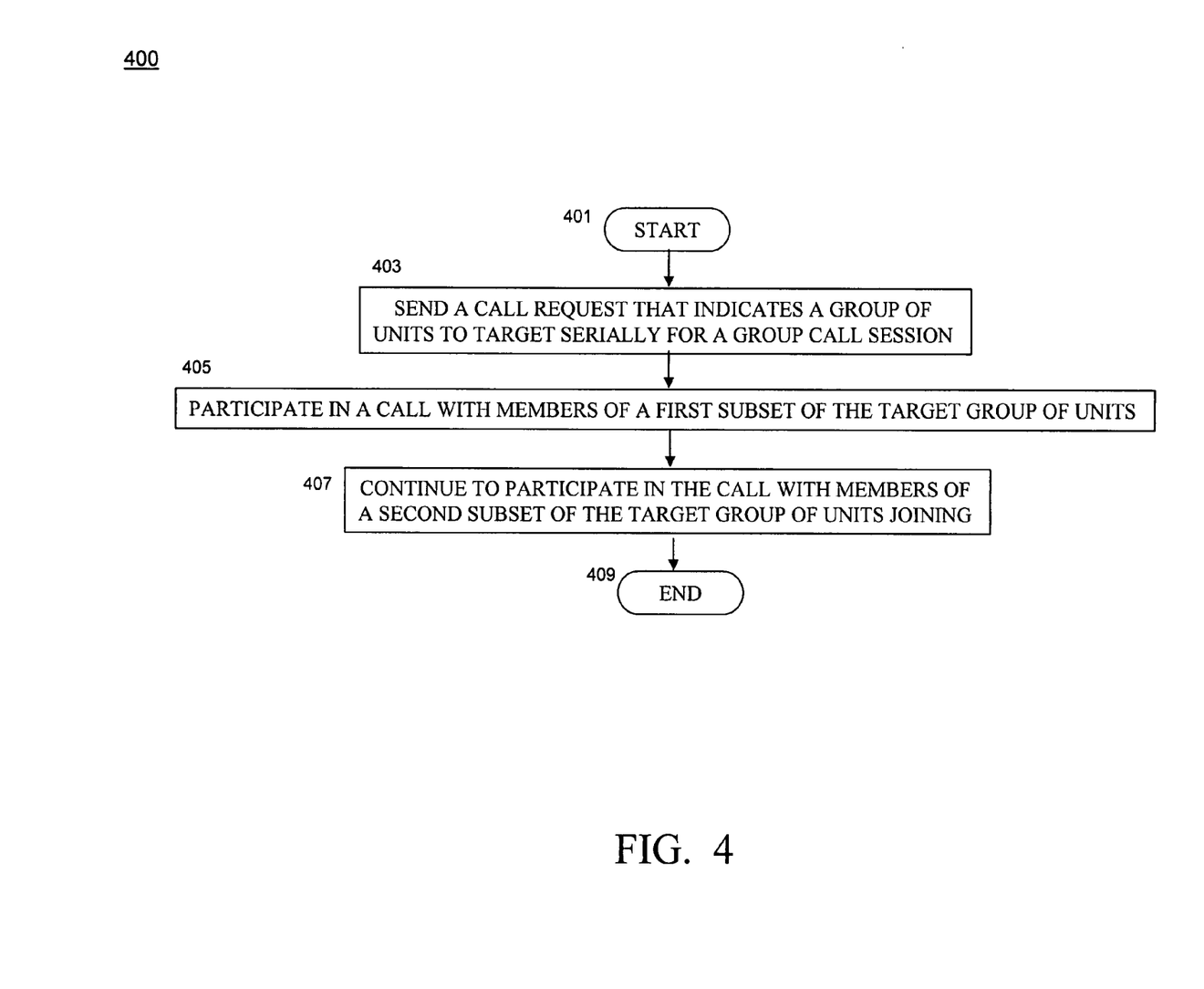
FIG. 4 is a logic flow diagram of functionality performed by a remote unit in accordance with certain embodiments of the present invention.

FIG. 4 is a logic flow diagram of functionality performed by a remote unit in accordance with certain embodiments of the present invention. Logic flow 400 begins (401) when the remote unit sends (403) a call request that indicates a group of units to target serially for a group call session. The remote unit then participates (405) in a call with members of a first subset of the target group of units during a first portion of the group call session. After beginning to participate in the call with members of the first subset, the remote unit then continues to participate (407) in the call with members of a second subset of the target group of units joining the group call session, and logic flow 400 ends (409). However, the step represented by block 407 may be reiterated for subsequent call stages that involve new subsets of group members joining.

Figure 5:
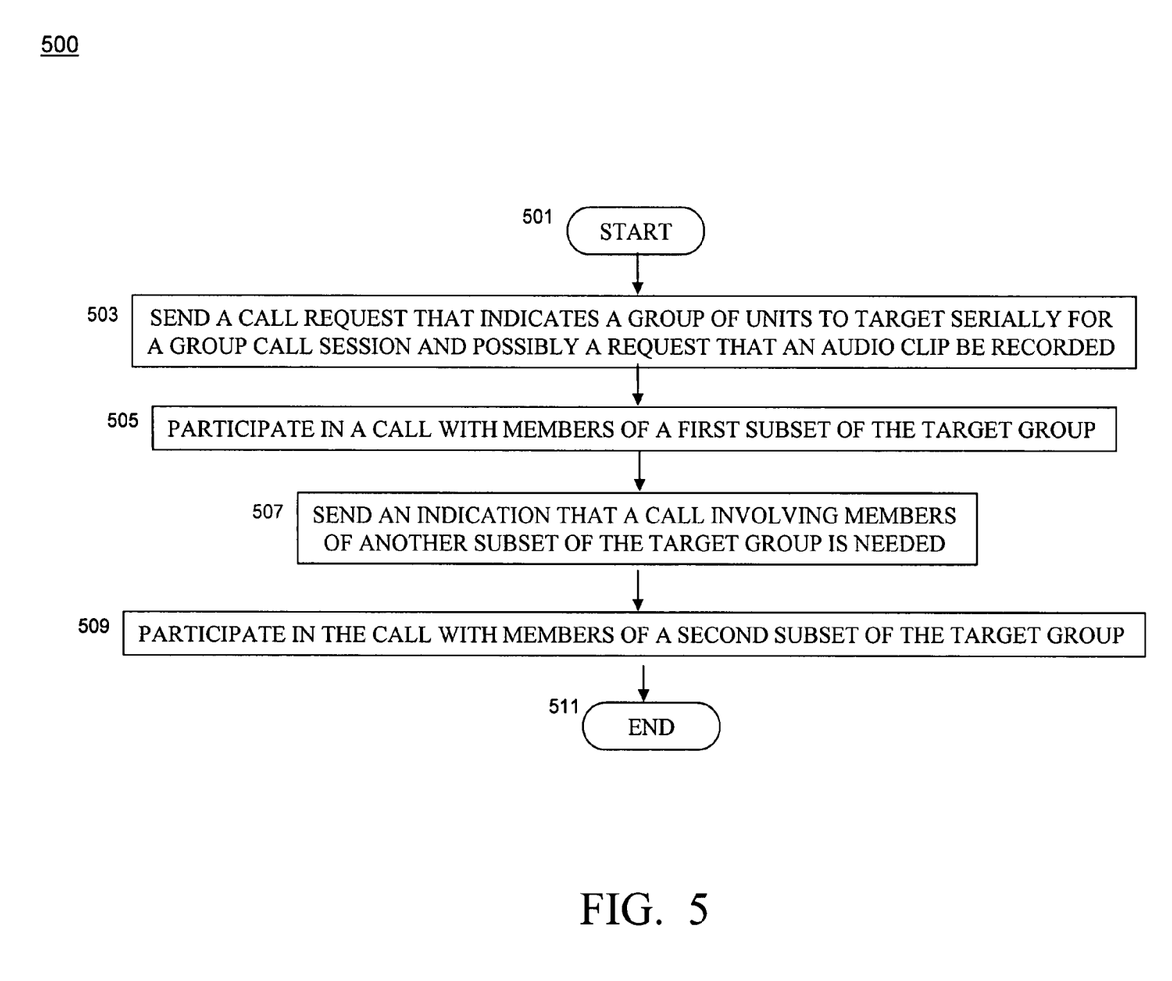
FIG. 5 is a logic flow diagram of functionality performed by a remote unit in accordance with certain embodiments of the present invention.

FIG. 5 is a logic flow diagram of functionality performed by a remote unit in accordance with certain embodiments of the present invention. Logic flow 500 begins (501) when the remote unit sends (503) a call request that indicates a group of units to target serially for a group call session. The remote unit may also request (at this time or at another) that an audio clip be recorded by the FNE. The remote unit then participates (505) in a call with members of a first subset of the target group of units during a first portion of the group call session. The remote unit may then send (507) an indication that a call involving other members of the target group is needed or desired. After beginning to participate in the call with members of the first subset, the remote unit then participates (509) in the call with members of a second subset of the target group of units joining the group call session, and logic flow 500 ends (511). However, the steps represented by blocks 507 and 509 may be reiterated for subsequent call stages that involve new subsets of group members joining and perhaps previous participants leaving.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for serially establishing a group call session comprising:

receiving, from a caller, a call request that indicates a group of units to target for a group call session;

selecting a first subset of the target group of units;

signaling the first subset of the target group of units to join the group call session;

selecting a second subset of the target group of units that differs from the first subset;

subsequent to signaling the first subset, signaling the second subset of the target group of units to join the group call session.

2. The method of claim 1, wherein receiving the call request that indicates the group of units to target for the group call session comprises performing at least one step from the group consisting of:

receiving a call request that provides a group identifier to identify the group of units to target for the group call session, receiving a call request that identifies units individually to identify the group of units to target for the group call session, receiving a call request that further indicates a maximum number of participants allowed for the group call session, and receiving a call request that further provides a maximum number of participants allowed for the group call session.

3. The method of claim 1, wherein selecting the first subset of the target group of units comprises selecting the first subset of the target group of units based on a presence state of units in the target group.

4. The method of claim 3, wherein selecting the first subset of the target group of units based on a presence state of units in the target group comprises selecting at least one unit having a presence state that indicates that the at least one unit is available.

5. The method of claim 3, wherein selecting the first subset of the target group of units based on a presence state of units in the target group comprises selecting at least one unit having a presence state that was last updated within a threshold period of time.

6. The method of claim 1, wherein selecting the first subset of the target group of units comprises selecting the first subset of the target group of units based on at least one characteristic of at least one unit from the group consisting of:

a remaining battery life indicated by the at least one unit of the target group, whether the at least one unit of the target group indicates that it is plugged into a power source, an access technology to be used by the at least one unit of the target group, a relative cost associated with an access technology to be used by the at least one unit of the target group, a loading level of a serving cell of the at least one unit of the target group, a mobility level of the at least one unit of the target group, a trajectory of the at least one unit of the target group, a location of the at least one unit of the target group, whether the at least one unit of the target group is operating in an automatic answer mode, wireless operating conditions of the at least one unit of the target group, degree of similarity between wireless operating conditions of the at least one unit of the target group and wireless operating conditions associated with the caller, whether a page response was received from the at least one unit of the target group, a priority status associated with the at least one unit of the target group, and a service class associated with the at least one unit of the target group.

7. The method of claim 1, wherein selecting the first subset of the target group of units comprises performing at least one step from the group consisting of:

paging at least one unit from the target group of units and requesting a presence update from at least one unit of the target group of units.

8. The method of claim 7, wherein selecting the first subset of the target group of units comprises signaling units in at least one manner from the group consisting of transmitting a paging message associated with the target group only in cells having a loading level below a load threshold, transmitting a paging message associated with the target group at a lower power level than other pages, and transmitting a paging message associated with the target group with less redundancy than other pages.

9. The method of claim 1, wherein selecting the first subset of the target group of units comprises selecting the first subset of the target group of units in accordance with an indication of a subset received from the caller.

10. The method of claim 1, wherein selecting the second subset of the target group of units comprises selecting the second subset of the target group of units in accordance with an indication of a subset received from the caller.

11. The method of claim 1, further comprising establishing a call involving members of the first subset of the target group during a first portion of the group call session;

establishing a call involving members of the second subset of the target group during a second portion of the group call session.

12. The method of claim 11, further comprising receiving, from the caller, a request to record audio for delivery to at least the call involving members of the second subset of the target group during the second portion of the group call session.

13. The method of claim 11, further comprising receiving, after signaling the first subset of the target group of units to join the group call session and before signaling the second subset of the target group of units to join the group call session, an indication that a call involving members of a subset of the target group other than the first subset is needed.

14. The method of claim 13, wherein receiving the indication that a call involving members of a subset other than the first subset is needed comprises receiving an indication from the group consisting of a request from the caller for a call involving another subset of the target group, a request from a member of the first subset for a call involving another subset of the target group, an expiration of a response timer associated with a member of the first subset without receiving a response from the member of the first subset, and a non-acceptance to join the group call session from a member of the first subset.

15. The method of claim 1, wherein selecting the first subset of the target group of units comprises selecting a maximum number of group participants for a group call session.

16. The method of claim 15, further comprising determining that a non-joining number of units from the first subset is not joined to the group call session, wherein selecting the second subset of the target group of units comprises selecting a non-joining number of units for the second subset.

17. The method of claim 16, further comprising
establishing a call involving members of the first subset of the target group and members of the second subset of the target group.

18. Fixed network equipment (FNE) comprising:
a network interface;
a processing unit, communicatively coupled to the network interface,
 adapted to receive, from a caller via the network interface, a call request that indicates a group of units to target for a group call session,
 adapted to select a first subset of the target group of units,
 adapted to signal, via the network interface, the first subset of the target group of units to join the group call session,
 adapted to select a second subset of the target group of units that differs from the first subset, and
 adapted to signal, via the network interface subsequent to signaling the first subset, the second subset of the target group of units to join the group call session.

* * * * *